(12) United States Patent
Arsenault et al.

(10) Patent No.: US 8,347,333 B1
(45) Date of Patent: Jan. 1, 2013

(54) MODIFIED ELECTRONIC PROGRAM GUIDE

(75) Inventors: Robert G. Arsenault, Redondo Beach, CA (US); Tam T. Leminh, Cypress, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3368 days.

(21) Appl. No.: 10/640,111

(22) Filed: Aug. 13, 2003

(51) Int. Cl.
*G06F 3/00* (2006.01)
*G06F 13/00* (2006.01)
*H04N 5/445* (2006.01)

(52) U.S. Cl. ............................. 725/44; 725/39; 725/40

(58) Field of Classification Search .............. 725/37–61, 725/132, 140
See application file for complete search history.

(56) References Cited

U.S. PATENT DOCUMENTS

| | | | | |
|---|---|---|---|---|
| 5,548,338 A * | 8/1996 | Ellis et al. | | 725/54 |
| 5,635,978 A * | 6/1997 | Alten et al. | | 725/42 |
| 5,652,613 A * | 7/1997 | Lazarus et al. | | 725/50 |
| 5,760,821 A | 6/1998 | Ellis et al. | | |
| 5,798,785 A * | 8/1998 | Hendricks et al. | | 725/46 |
| 5,886,690 A | 3/1999 | Pond et al. | | |
| 6,028,599 A * | 2/2000 | Yuen et al. | | 725/50 |
| 6,118,492 A * | 9/2000 | Milnes et al. | | 725/52 |
| 6,160,545 A | 12/2000 | Eyer et al. | | |
| 6,181,333 B1 | 1/2001 | Chaney et al. | | |
| 6,909,384 B2 * | 6/2005 | Baldwin et al. | | 341/55 |
| 2002/0044144 A1 * | 4/2002 | Inoue | | 345/204 |
| 2002/0059623 A1 * | 5/2002 | Rodriguez et al. | | 725/91 |
| 2002/0188956 A1 * | 12/2002 | Ficco et al. | | 725/110 |
| 2003/0023975 A1 * | 1/2003 | Schrader et al. | | 725/51 |
| 2003/0056216 A1 * | 3/2003 | Wugofski et al. | | 725/46 |
| 2003/0159147 A1 * | 8/2003 | Young et al. | | 725/47 |
| 2003/0198461 A1 * | 10/2003 | Taylor et al. | | 386/83 |
| 2003/0204847 A1 * | 10/2003 | Ellis et al. | | 725/42 |

* cited by examiner

*Primary Examiner* — Scott Beliveau
*Assistant Examiner* — Alexander Q Huerta

(57) ABSTRACT

The present invention enables a broadcaster to vary the time and the descriptive information in a program guide on a per-channel basis. A priority ranking system of the channels allows the preparation of multiple versions of a program guide in order to fit the guide into the memory space allocated in a receiver. When constructing the program guide, the algorithm of the present invention fits the longest title variation allowed while still keeping the total size of the guide product within space constraints supported by the receiver.

1 Claim, 4 Drawing Sheets

MODIFIED ELECTRONIC PROGRAM GUIDE

TECHNICAL FIELD

The present invention relates generally to an electronic program guide and more particularly to a method and system for modifying the content of the program guide using a fixed amount of memory.

BACKGROUND OF THE INVENTION

Electronic program guide data for television is delivered to integrated receiver/decoders (IRDS), or set-top boxes (STBs), by way of a satellite network or a cable television system. The program guide typically contains scheduling information for programming services that are provided by the satellite or cable provider. Limitations of the electronic program guide stem from the amount of bandwidth available to carry the scheduling information and the amount of memory required to store the scheduling information at the integrated receiver/decoder.

Integrated receiver/decoders typically have a fixed amount of memory. Random access memory (RAM) is relatively expensive, and there is a need to keep the cost of the receiver/decoder low to keep it relatively inexpensive for consumers. This conflicts with the need to provide detailed program information to the consumer, for the amount of program information to be communicated increases as more channels are added by the satellite or cable provider.

One proposed solution involves limiting the program guide data to a particular region of interest. Irrelevant data is filtered from the program guide before being stored by the receiver. However, as the number of channels broadcast by a provider increases, the amount of content to a particular region of interest is also increased. Therefore, the problem of limited receiver memory still remains.

There is a need for accommodating an ever-increasing program guide within a fixed amount of receiver memory without limiting the information supplied to a consumer.

SUMMARY OF THE INVENTION

The present invention is a method for fitting a program guide within a constrained amount of receiver memory. An algorithm is applied at the broadcast site that reduces a receiver's memory requirements by selecting an appropriately sized title, thereby keeping the total program guide size within a receiver's allocated space. In another embodiment of the present invention, the receiver can selectively store the proper-sized titles that fit within the receiver's allocated memory and discard those that are too long.

There are several advantages to the present invention. The application of the algorithm allows a provider to add more channels, exceeding the limits of the receiver architecture, by keeping the total guide memory requirements within the original limits.

It is an object of the present invention to maximize the use of a fixed amount of memory available in the receiver for storing an electronic program guide. It is another object of the present invention to reduce a receiver's memory requirements by selecting appropriately sized titles, thereby keeping the total guide to a predetermined size. It is still another object of the present invention to provide a means for reducing the receiver's memory requirements when the amount of channels in the guide is increased.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention. In the drawings.

DETAILED DESCRIPTION OF PREFERRED EMBODIMENTS

Figure 1:
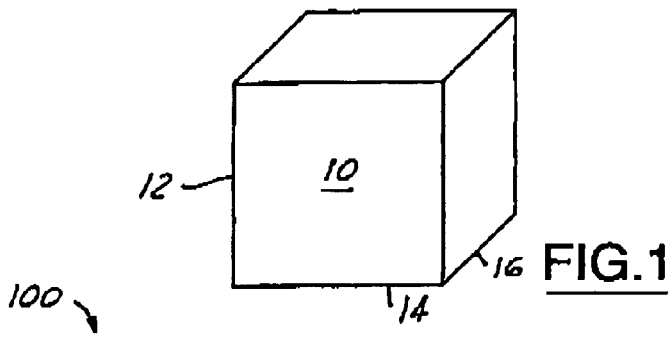
FIG. 1 is a three-dimensional graph of a program guide.

The present invention is described herein in accordance with the visual of a program guide 10 provided in FIG. 1. In the prior art, the program guide was managed as a two-dimensional space providing channel numbers and program times. The present invention can be visualized in three dimensions as shown in FIG. 1. The program guide 10 has a channel dimension 12, a time dimension 14, and a descriptive information dimension 16. The channel dimension 12 includes channel numbers, the channel's frequency, satellite identification, and service information such as program identifiers and service types. The time dimension 14 represents the amount of descriptive scheduling the guide contains. The descriptive information dimension 16 represents the detail (richness) of the scheduling information provided for the time covered by the program guide.

The present invention provides algorithms and a method for their application that allows a broadcaster to vary the time and the descriptive information dimension of the program guide 10 on a per channel basis based on a priority ranking assigned to the channels. For example, a highly valued channel will have information for programming in one day of time, whereas lower priority channels might have information for programming for only two hours of time. In applying the algorithms, a highly valued channel might have titles that are thirty to forty characters in length whereas the lower valued channels range in character length from ten to twenty characters.

Figure 2:
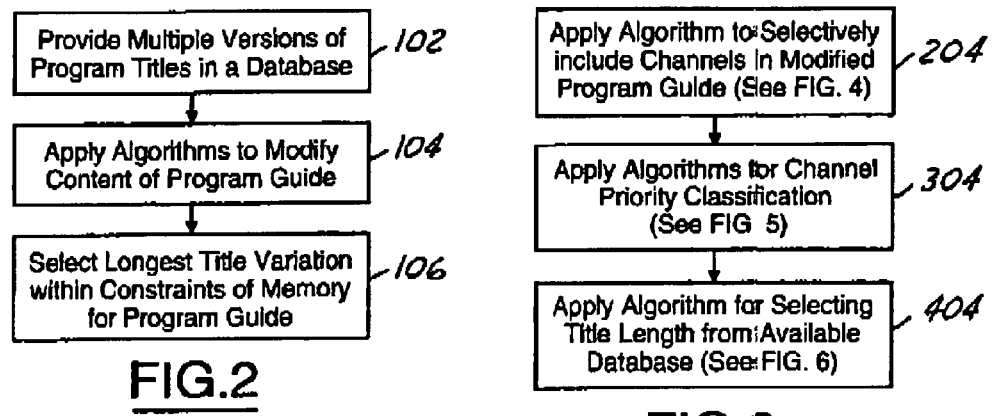
FIG. 2 is a flowchart of the method of the present invention.

Referring now to FIG. 2, the broadcaster constructs 100 a program guide from a schedule lineup it receives for each channel. Each schedule lineup references the times and programs scheduled on a particular channel. A database, or a guide programmer, provides multiple prepared versions of titles 102 for each program. The title variations per program range in character length, say from ten characters or less up to a hundred characters or more.

Several algorithms are applied 104 to the database that result in a modification of the content of the program guide. The present invention then selects 106 the longest title variation to be stored on and displayed by the receiver and still be supported by the total memory in the receiver that is available for the guide. Therefore, the present invention provides a modified guide having the most detailed information that still fits within the space constraints supported by a receiver. While the description and Figures herein detail three versions of the title being long, medium, and short, it should be noted that the number of versions is virtually unlimited and range from two or more, such as 1, 2, 3, . . . n, whereby n titles are made available to choose from.

Figure 3:
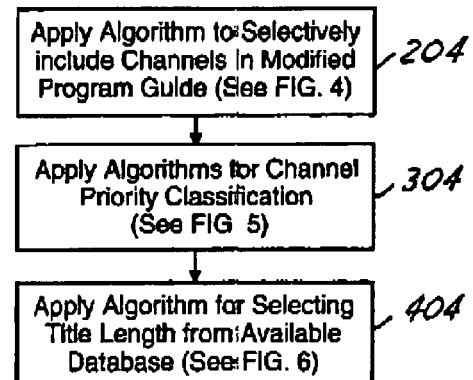
FIG. 3 is a flowchart of the algorithm application process.
Figure 4:
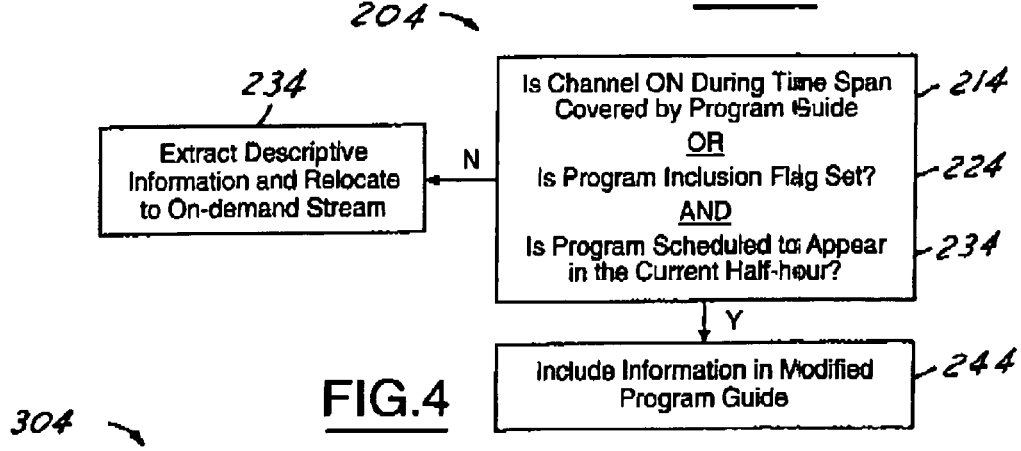
FIG. 4 is a flowchart of the channel inclusion algorithm.

Referring to FIG. 3, a broad perspective of the program guide modification method 104 of the present invention is presented in flowchart form. The algorithms are used to determine the selection of titles for the channels in the program guide line-up. To reduce channel space in the program guide, channels can be selectively included 204 for the time periods that each channel is "on the air." The channel selection algorithm 204 is described in greater detail with reference to FIG. 4. According to the channel selection algorithm 204, if an ON period for a particular channel falls within a time span covered by the program guide 214, or if a program inclusion flag is set 224 (PG_INCLUSION) and a program is scheduled to appear in the current half hour 234, then that particular channel will be included 244 in the guide product. Program inclusion can be an attribute program that mandates the channel to be in an "ON" state for any part of the program's broadcast duration. In other words, regardless of the network's planned on-the-air and off-the-air times, a PG_INCLUSION program, whenever scheduled, defines that channel as being "on the air" for a particular program's duration.

a channel is included in the master guide product, it may be considered to be in an ON state or an OFF state. An "ON state" is defined as the channel having no day_part periods or at least one day_part period covering the current half-hour. "Day_part" is a term used to describe a channel that is not always on the air. A day_part channel 'signs off' and stops transmitting video for a portion of the broadcast day. In the master program guide, a day_part channel might always remain in the guide, but tuning the channel causes differing results dependent upon whether the channel is in an on-the-air state or in an off-the-air state. If the channel is presently on the air or turning on the air in the current half hour, the master program guide considers that channel as being in the ON state. Otherwise, it is in the OFF state.

The "OFF state" is defined for the channels when the current half hour is not covered by any of the day-part periods. It should be noted that not all the channels included in the master program guide are displayed by an integrated receiver/decoder (IRD). The IRD will only display channels that meet the receiver's screening rules. In addition, a smart card in the receiver has screening rules that are also applied to the program guide and that further limit the channels that are displayed.

The screening rules can be described as a Customer Service Segment (CSS), which is a classification of the customer's information for the account types and customer group. The IRD displays only the channels that pass the customer's classification and the conditional access of the smart card within the receiver. This information is retained locally at the customer's receiver and is considered by the program guide generator system. Therefore, a channel will only appear in the guide if it is included in the customer service segment list contained in the local program guide generator system. This can be accomplished in several ways. A typical example is to apply a bitmap for a channel against a bitmap in the receiver, or smartcard. If a logical AND of the two bitmaps is non-zero, then the channel is displayed. In another example, an expression syntax is used, such as in an assembly language format. The expression is evaluated by an interpreter in the receiver to determine a TRUE or FALSE result. Only those channels with a TRUE result are displayed.

Figure 5:
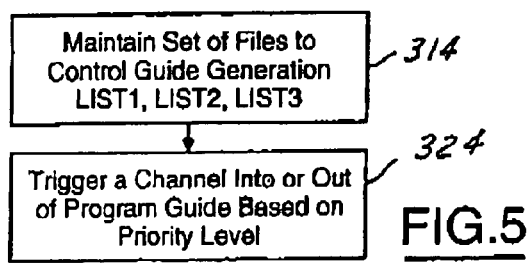
FIG. 5 is a flowchart of the channel priority assignment algorithm.

Referring back to FIG. 3, an algorithm is applied 304 that classifies each channel in the program guide generator system using a priority scheme. FIG. 5 describes this algorithm in detail. The priority classification algorithm applies rules that reduce the program guide's descriptive information on a per-channel basis. The program guide generator system maintains 314 a set of files to control the manner of guide generation. It should be noted that while the present invention is described herein with three lists, two or more lists may be used. There is no limit to the number of titles and the quantity of information removed, and three lists are merely used herein as an example. Two or more lists, such as LIST1, LIST2, . . . , and LISTN, is a general application of the present invention. Three lists are described herein for simplicity purposes. A first list, LIST1, is a file resident on the program guide generator system having a list of channels with low priority. A second list, LIST2, is a resident file having medium priority channels in the list. And the high priority channels are listed in a third list, LIST3.

The channel priority is assigned by storing the channel in its associated list file. One skilled in the art is capable of assigning the channels to their respective lists and factors too numerous to mention herein come into play in assigning each channel to its respective list. For example, channels with engineering test purposes are likely to be assigned to the low priority channel list. One skilled in the art is capable of determining the factors that should be used in assigning the channels to their respective lists.

The channels are selectively included or excluded if it has a particular customer service segment value. Based on the list each channel is assigned to, the broadcast can trigger the channel into or out of the program guide in real-time. The list the channel appears in will affect the customer service segment value, thereby affecting whether or not the channel is listed in the modified program guide.

Figure 6A:
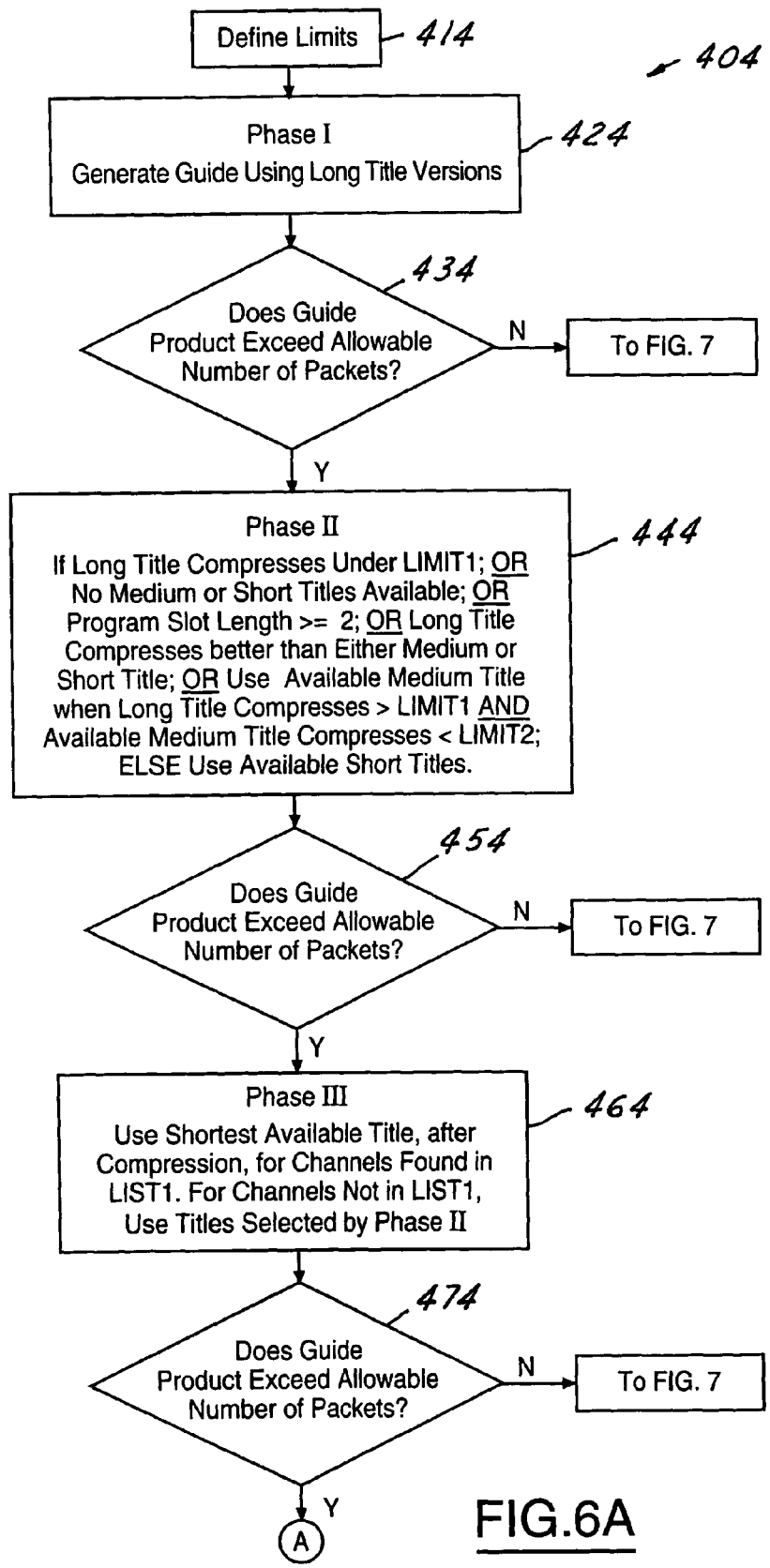
FIG. 6A is a flowchart of the program guide generation method of the present invention.
Figure 6B:
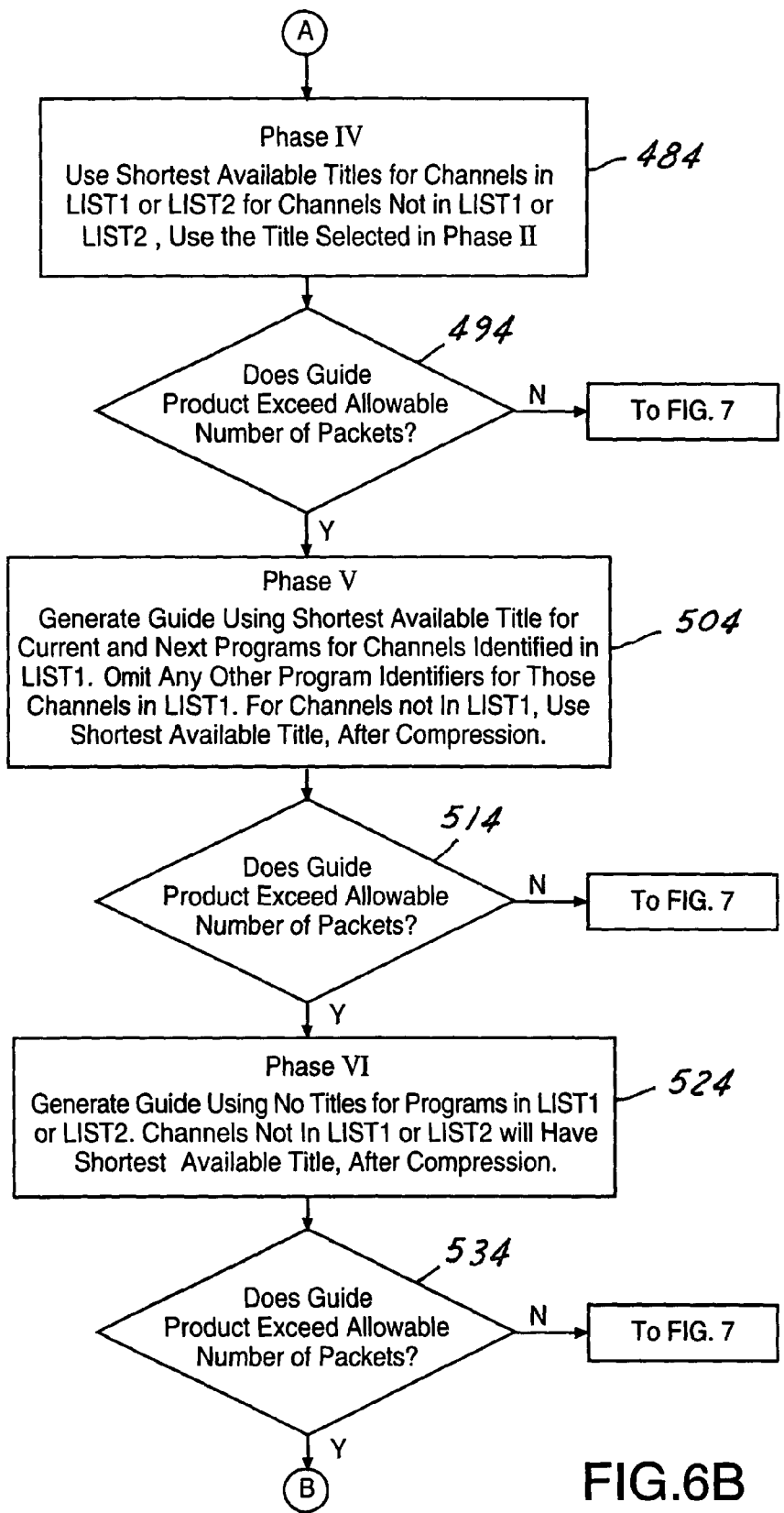
FIG. 6B is a continuation of the flowchart of FIG. 6A.
Figure 6C:
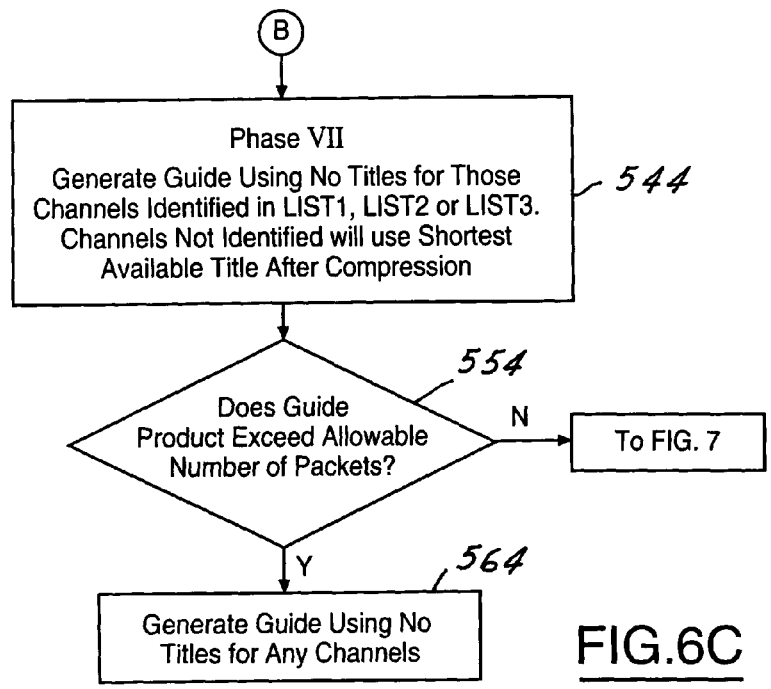
FIG. 6C is a continuation of the flowchart of FIG. 6B.

Referring again to FIG. 3, an algorithm 404 is applied to determine the selection of the title variations provided in the database in order to maintain the most information in the limited memory space available for the program guide. FIG. 6 describes this program guide generation algorithm in detail. It should be noted that the present invention is not limited to short, medium and long versions of titles. Two or more title lengths are sufficient, and the short, medium and long versions described herein are for example purposes.

Referring to FIG. 6, the algorithm has limits set by definition 414. For example, a long title is defined to be forty characters, a medium title is defined to be 20 characters, and a short title is ten characters. In the present example, a first limit LIMIT1 is set to fifteen bytes, and a second limit LIMIT2 is set to ten bytes. It should be noted that these limits are for example purposes only and may be altered without departing from the scope of the claims hereinafter.

In Phase I of the algorithm, a first guide product is generated 424 using all long titles. If the size of the guide product exceeds the allowable number of packets 434, a second guide product is generated 444 using the following rules. IF the long title compresses under LIMIT1; OR no medium or short titles are available; OR the long title compresses better than either the medium or the short title; OR available medium title is used when the long title compresses greater than LIMIT1 AND the available medium title compresses less than LIMIT2; ELSE use available short titles.

If the size of the modified second guide product still exceeds the allowable number of packets 454, Phase II 464 of the algorithm generates a guide product using the shortest available titles, after compression, for those channels identified in LIST1. For channels not in LIST1, the titles generated by Phase II are used.

If the size of the modified third guide product still exceeds the allowable number of packets 474, a modified fourth guide product is generated 484 using the shortest available titles for channels found in LIST1 and LIST2. For channels not in LIST1 or LIST2, the titles generated by Phase II are used. Again, the size of the guide product is tested to see if it exceeds the allowable number of packets, 494.

In the event the fourth guide is still too large, a fifth program guide is generated 504 using the shortest available titles for only the current and next program channels identified in LIST1. The modified fifth program guide will omit any other program identifiers 514 for those channels in LIST1. The remaining time for those LIST1 channels will appear as a programming gap in the guide. For channels not in LIST1, the shortest available title, after compression, for all programs is used.

Once again, the guide is examined 514 to determine if the product exceeds the maximum allowable number of packets. If the guide product still exceeds the allowable number of packets, a modified sixth program guide is generated 524 using no titles for the channels identified in LIST1 or in LIST2. "Regular Schedule" will appear for all programs, and not just the current and next program.

If the guide product still exceeds 534 the allowable number of packets, a seventh program guide is generated 544 using no titles for channels identified in LIST1, LIST2, or LIST3. "Regular Schedule" appears for those channels in the lists. Those channels not in the lists will use the shortest available title after compression. And should the guide still exceed the allowable number of packets 554, the guide is generated 564 using no titles for any of the channels. All channels will appear as "Regular Schedule." This will prevent video outages, but may result in guide-related issues with the customer.

Figure 7:
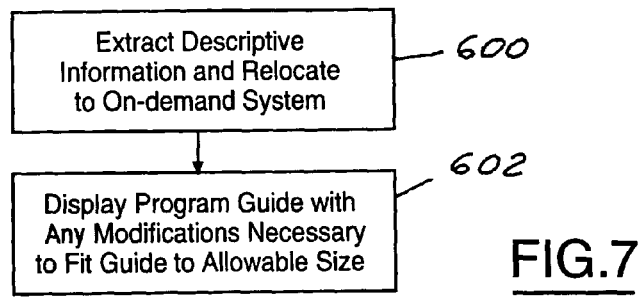
FIG. 7 is a flowchart of the program guide display method.

Referring now to FIG. 7, in the event the program guide has been modified by the present invention, the extracted information is relocated to an on-demand system 600. The program guide, with any necessary modifications having been made thereto, is stored and displayed by the receiver 602.

The real title of the program will be defined as "real title" and will be the one hundred and twenty character version of the title. When the "real title" is not the same as the title used in the modified program guide, then the real title is prepended to the description text. Additional description text can be sent outside the space allocated for the channel, time, and descriptive information. The detail (richness) is removed from the product guide program space and moved to other descriptive information packets and is sent in an on-demand description stream.

Figure 8:
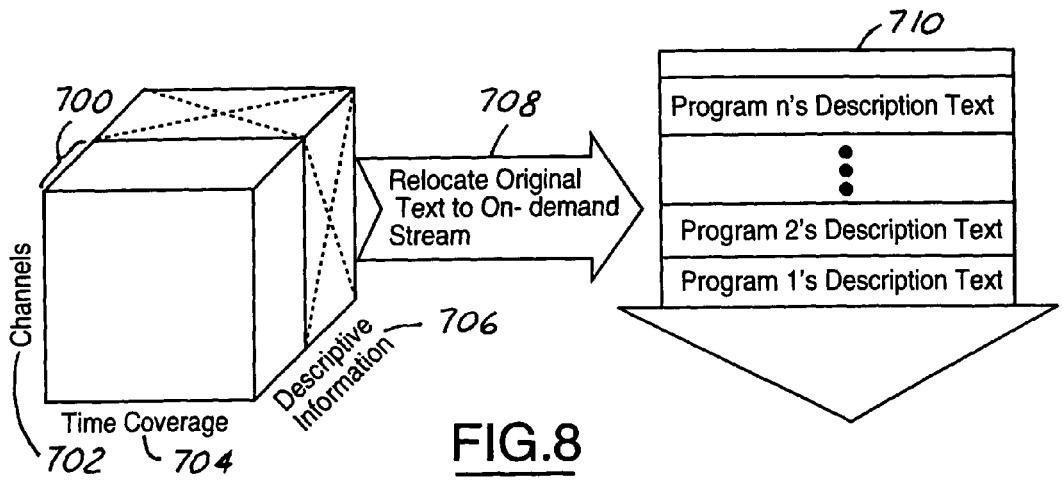
FIG. 8 is a block diagram of the modified program guide having an on-demand stream of supplemental data.

FIG. 8 is a visual showing the modified guide product 700 as it is prepared in three dimensions 702, 704, 706 and displayed on demand by a user at the integrated receiver/decoder. The modified guide product is smaller in size than the original guide product and requires less receiver memory to hold. Some of the descriptive information has been extracted as the algorithms of the present invention were applied to the guide content. The material that was removed is relocated 708 to an on-demand stream 710 of supplemental descriptive information. With the on-demand stream, the receiver doesn't have to store supplemental information for the entire program guide at once. The receiver retains only a single program's descriptive information in memory at a time. Therefore, the total amount of memory demanded to process the guide and its descriptive information is reduced.

The present invention allows a broadcaster to vary the time and the descriptive information in the program guide or a per-channel basis. A priority ranking system of the channels allows the preparation of multiple versions of a program guide in order to fit the guide into the memory space allocated in the receiver. When constructing the program guide, the algorithm of the present invention fits the longest title variation allowed while still keeping the total size of the guide product within space constraints supported by the receiver.

The invention covers all alternatives, modifications, and equivalents, as may be included within the spirit and scope of the appended claims.

What is claimed is:

1. A method for generating an electronic program guide, said method comprising the steps of:
    (a) providing multiple selectable versions of titles for programs that are viewable on a plurality of channels, wherein the said selectable versions have of said titles of have varying character lengths;
    (b) preliminarily determining which of said channels are to be selectively included in said electronic program guide;
    (c) assigning a priority classification to each of said channels that were preliminary determined to be included in said electronic program guide;
    (d) preliminary selecting long-title versions of said titles from said selectable versions of said titles for programs that are viewable on said channels that were preliminarily determined to be included in said electronic program guide;
    (e) preliminarily generating said electronic program guide so that said electronic program guide preliminarily includes (i) each of said channels that were preliminarily determined to be included in said electronic program guide and (ii) each of said long-title versions of said titles for said programs that are viewable on said channels that were preliminarily determined to be included in said electronic program guide; and
    (f) modifying and regenerating said electronic program guide as necessary so as to reduce the amount of memory space taken up by said channels and said titles preliminarily included in said electronic program guide and thereby fit said electronic program guide in the fixed memory space of a receiver;
    wherein step (a) is at least partially accomplished by creating a database of that includes said multiple selectable versions of said titles;
    wherein the said database contains a plurality of versions of a title for each of said programs that are viewable on the said plurality of channels, and each of said versions of a title has a different number of characters and hence a different length;
    wherein step (c) is at least partially accomplished by assigning a low, medium, or high priority to each of said channels and storing each of said channels in a list corresponding to a priority classification of 1, 2, . . . N, thereby defining LIST1, LIST2, . . . LISTN respectively;
    said method further comprising the steps of:
    setting a first byte limit for a program title;
    setting a second byte limit for a program title;
    generating a first version of an said electronic program guide using all long-title versions; determining if the said first version of an said electronic program guide is within an allowable memory size limit;
    storing and displaying the said first version of an said electronic program guide at a said receiver when the said first version is within the said allowable memory size limit;

generating a second version of an said electronic program guide when the said first version exceeds the said allowable memory size limit, the said second version being generated using:
(a) long-title versions that are compressed under the said first byte limit;
(b) a medium-title version when long-title version is greater than the said first byte limit and the medium-title version is available and compresses below the said second byte limit; and
(c) a short-title version when the said medium-title version is greater than the said second byte limit;
determining if the said second version of an said electronic program guide is within an said allowable memory size limit;
storing and displaying the said second version of an said electronic program guide at a said receiver when the said second version is within the said allowable memory size limit;
generating a third version of an said electronic program guide when the said second version exceeds the said allowable memory size limit, the said third version generated using:
(a) a shortest available title, after compression, for channels found in LIST1; and
(b) using titles selected by the said second version for channels not found in LIST1;
determining if the said third version of an said electronic program guide is within the said allowable memory size limit;
storing and displaying the said third version of the said electronic program guide at a said receiver when the said third version is within the said allowable memory size limit;
generating a fourth version of an said electronic program guide when the said third version exceeds the said allowable memory size limit, the said fourth version generated using;
(a) a shortest available title, after compression, for channels in LIST1 or LIST2; and
(b) a title selected in the said second version for channels not listed in LIST1 or LIST2;
determining if the said fourth version of an said electronic program guide is within the said allowable memory size limit;
storing and displaying the said fourth version of the said electronic program guide at a said receiver when the said fourth version is within the said allowable memory size limit;
generating a fifth version of an said electronic program guide when the said fourth version exceeds the said allowable memory size limit, the said fifth version generated using;
(a) a shortest available title for a current program and a next program for channels identified in LIST1;
(b) omitting any other program identifiers for channels listed in LIST1; and
(c) a shortest available title, after compression, for channels not listed in LIST1;
determining if the said fifth version of an said electronic program guide is within the said allowable memory size limit;
storing and displaying the said fifth version of the said electronic program guide at a said receiver when the said fifth version is within the said allowable memory size limit;
generating a sixth version of an said electronic program guide when the said fifth version exceeds the said allowable memory size limit, the said sixth version generated using;
(a) no titles for programs on channels found in LIST1 or LIST2; and
(b) a shortest available title, after compression, for channels not found in LIST1 or LIST2;
determining if the said sixth version of an said electronic program guide is within the said allowable memory size limit;
storing and displaying the said sixth version of the said electronic program guide at a said receiver when the said sixth version is within the said allowable memory size limit;
generating a seventh version of an said electronic program guide when the said sixth version exceeds the said allowable memory size limit, the said seventh version generated using;
(a) no titles for programs on channels identified in LIST1, LIST2, or LIST3; and
(b) a shortest available title, after compression, for channels not identified in LIST1, LIST2, or LIST3;
determining if the said seventh version of an said electronic program guide is within the said allowable memory size limit;
storing and displaying the said seventh version of the said electronic program guide at a said receiver when the said seventh version is within the said allowable memory size limit;
generating a an eighth version of an said electronic program guide when the said seventh version exceeds the said allowable memory size limit, the said eighth version generated using no titles for any channels; and
storing and displaying the said eighth version of the said electronic program guide at the said receiver.

* * * * *